United States Patent [19]
Ward

[11] Patent Number: 5,448,708
[45] Date of Patent: Sep. 5, 1995

[54] SYSTEM FOR ASYNCHRONOUSLY DELIVERING ENQUEUE AND DEQUEUE INFORMATION IN A PIPE INTERFACE HAVING DISTRIBUTED, SHARED MEMORY

[76] Inventor: James P. Ward, 6572 Amberwoods Dr., Boca Raton, Fla. 33433

[21] Appl. No.: 968,758

[22] Filed: Oct. 30, 1992

[51] Int. Cl.6 ............................................. G06F 13/38
[52] U.S. Cl. ............................. 395/200.13; 395/310; 395/474
[58] Field of Search .................... 395/325, 250, 425

[56] References Cited

U.S. PATENT DOCUMENTS

| | | | |
|---|---|---|---|
| 4,876,644 | 10/1989 | Nuechterlein et al. | 364/200 |
| 5,081,572 | 1/1992 | Arnold | 395/375 |
| 5,161,215 | 11/1992 | Kouda et al. | 395/250 |
| 5,214,783 | 5/1993 | Lips et al. | 395/725 |
| 5,247,616 | 9/1993 | Berggren | 395/425 |
| 5,317,720 | 5/1994 | Stamm et al. | 395/425 |
| 5,325,492 | 6/1994 | Bonevento et al. | 395/325 |
| 5,333,296 | 7/1994 | Bouchard et al. | 395/425 |
| 5,335,326 | 8/1994 | Nguyen et al. | 395/425 |

*Primary Examiner*—Jack B. Harvey
*Assistant Examiner*—Paul R. Myers
*Attorney, Agent, or Firm*—Homer L. Knearl; Holland & Hart

[57] ABSTRACT

In computing system where two entities of the system are transferring data, each entity enqueues and dequeues control elements for the data transfer on an outbound pipe and an inbound pipe, respectively. The enqueue and dequeue operations are based on local control information at the entity. This local control information is in part control information generated at the entity and in part surrogate control information generated at the other entity participating in the data transfer. This surrogate control information is stored at the other entity as well as a surrogate copy being stored in memory shared by both entities. Before an entity begins an enqueue or dequeue operation, it pulls the other entity's surrogate information as a single addressable block from shared memory and distributes it to its own local storage. This local storage is divided into outbound pipe control information and inbound pipe control information. Likewise, after an enqueue or dequeue operation, the entity assembles all of its locally generated control information and pushes it as a single addressable block to shared memory.

20 Claims, 9 Drawing Sheets

UNIT X ENQUEUE/DEQUEUE
DELIVERY SUPPORT

| FIG. 7A |
| FIG. 7B |

SYSTEM FOR ASYNCHRONOUSLY DELIVERING ENQUEUE AND DEQUEUE INFORMATION IN A PIPE INTERFACE HAVING DISTRIBUTED, SHARED MEMORY

CROSS REFERENCE TO RELATED APPLICATIONS

The present invention relates to patent application Ser. No. 07/411,145, filed Sep. 22, 1989, and entitled "Apparatus And Method For Asynchronously Delivering Control Elements With A Pipe Interface now U.S. Pat. No. 5,325,492." This cross-referenced application, which is hereby incorporated by reference, describes a distributed pipe, control command queueing system in which the present invention may be used.

BACKGROUND OF THE INVENTION

This invention is directed to control of a distributed pipe queuing system for control commands. More particularly, this invention is directed to advanced control structures in such a queueing system, and the processing of control structures commands with bus master state machines to enhance the communication of control commands between entities in the computing system.

In peer-to-peer computer/subsystem control systems, such as the IBM Subsystem Control Block architecture, entities in subsystem units, or the central processing unit, cooperate to process tasks without supervisory control by the central processor. A description of the PS/2 implementation of the Subsystem Control Block architecture is published in "SCB Architecture Supplement to the IBM Personal System/2 Hardware Interface Technical Reference Architectures," IBM Publication No. 85F-1678, which is hereby incorporated by reference.

To accomplish peer-to-peer communication control of control commands or elements, an entity communicates control elements in a pipeline duplex manner to another entity in the computing system. The pipelines, or pipes, are first-in first-out queues in shared memory. There is an outgoing pipe and incoming pipe between any two units in the computing system. A unit may be the central processing unit or a subsystem, and a unit may have one or more entities. When two entities work together to perform a task, one operates as the client and the other the server.

Control elements are defined in detail in the above-identified Technical Reference Manual 85F-1678. Control elements are used to exchange control information and data between entities functioning as client and server. Control elements convey requests, replies, events and errors between entities. A request control element sent by a client to a server requests the server to perform a task on behalf of the client. A reply control element is information from server to client in response to a request. An event control element contains information about the progress of performance in response to a request. Finally, an error control element contains error information about performance of a previous request, about status of the server, or status of the delivery of the control element.

It is an objective of this invention to provide better and simpler delivery support for enqueuing and dequeuing these control elements in delivery pipes between entities in the system.

SUMMARY OF THE INVENTION

In accordance with this invention, when two entities are transferring data, or commands, each entity enqueues and dequeues control elements for the transfer on the outbound pipe and the inbound pipe, respectively, and these enqueue and dequeue operations are based on local control information at the entity. This local control information is, in part, control information generated at the entity and, in part, control information generated at the other entity participating in the data transfer. This other entity control information is referred to as surrogate control information since it is generated at the other entity, and is stored there as well as a surrogate copy being stored in memory shared by the entities.

Each entity is provided with a local storage area in which it stores enqueue control information and dequeue control information. The enqueue and dequeue logic uses the control information from the local storage area to enqueue and dequeue control elements on the outbound pipe and inbound pipe, respectively. Both enqueue and dequeue require surrogate control information. Therefore, before an entity begins an enqueue or dequeue operation, it pulls the other entity's surrogate information as a single addressable block from shared memory, and distributes the surrogate information to its own local storage. Surrogate outbound pipe information is placed in the local enqueue control storage area, and surrogate inbound pipe information is placed in the local dequeue control storage area. Likewise, after an enqueue or dequeue operation, the entity assembles all of its locally-generated control information, and pushes it as a single addressable block to shared memory.

The advantages and features of the invention are many. For example, each entity has all the control information necessary for an enqueue, or a dequeue in its local storage. When performing enqueue and dequeue operations, the enqueue and dequeue logic load from local memory; they do not have to read from a remote shared memory. In addition, when surrogate control information is transferred between shared memory and local storage at an entity, it is pushed, or pulled, as a complete block representative of control information from the other entity in the data transfer operation. It is not pushed and pulled piecemeal as either just surrogate enqueue information, or surrogate dequeue information.

Other advantages and features of the invention will be understood by those of ordinary skill in the art after referring to the complete written description of the preferred embodiments in conjunction with the following drawings.

DESCRIPTION OF THE PREFERRED EMBODIMENTS

System Environment of Invention

The present invention makes use of Subsystem Control Block architecture, and improves on the delivery support logic and control structures used in delivering control elements whereby the delivery support logic may be implemented as a finite state machine. Subsystem Control Block architecture supports the delivery of control information between cooperating entities, as client and server, using a variable length control element. The control element can contain requests, replies, errors, or event notifications for an entity in another adapter (subsystem), or system unit, or for entities in the same adapter or system unit. A client, or server entity, may be in an adapter or system unit. An entity, acting as a client in an adapter, can send requests to a server entity in another adapter, the same adapter, or the system unit. This capability provides a peer-to-peer relationship between entities independent of their role (client or server), or their physical location (adapter or system unit).

Control elements are used to exchange control information between entities functioning as client and server. Control elements convey requests, replies, events, and errors between entities. A request control element, sent by a client to a server, requests the server to perform a task on behalf of the client. A reply control element is information from server to client in response to a request. An event notification control element contains information about the progress of performance in response to a request. Finally, an error control element contains error information about performance of a previous request, about status of the server, or status of the delivery of the control element.

Figure 1:
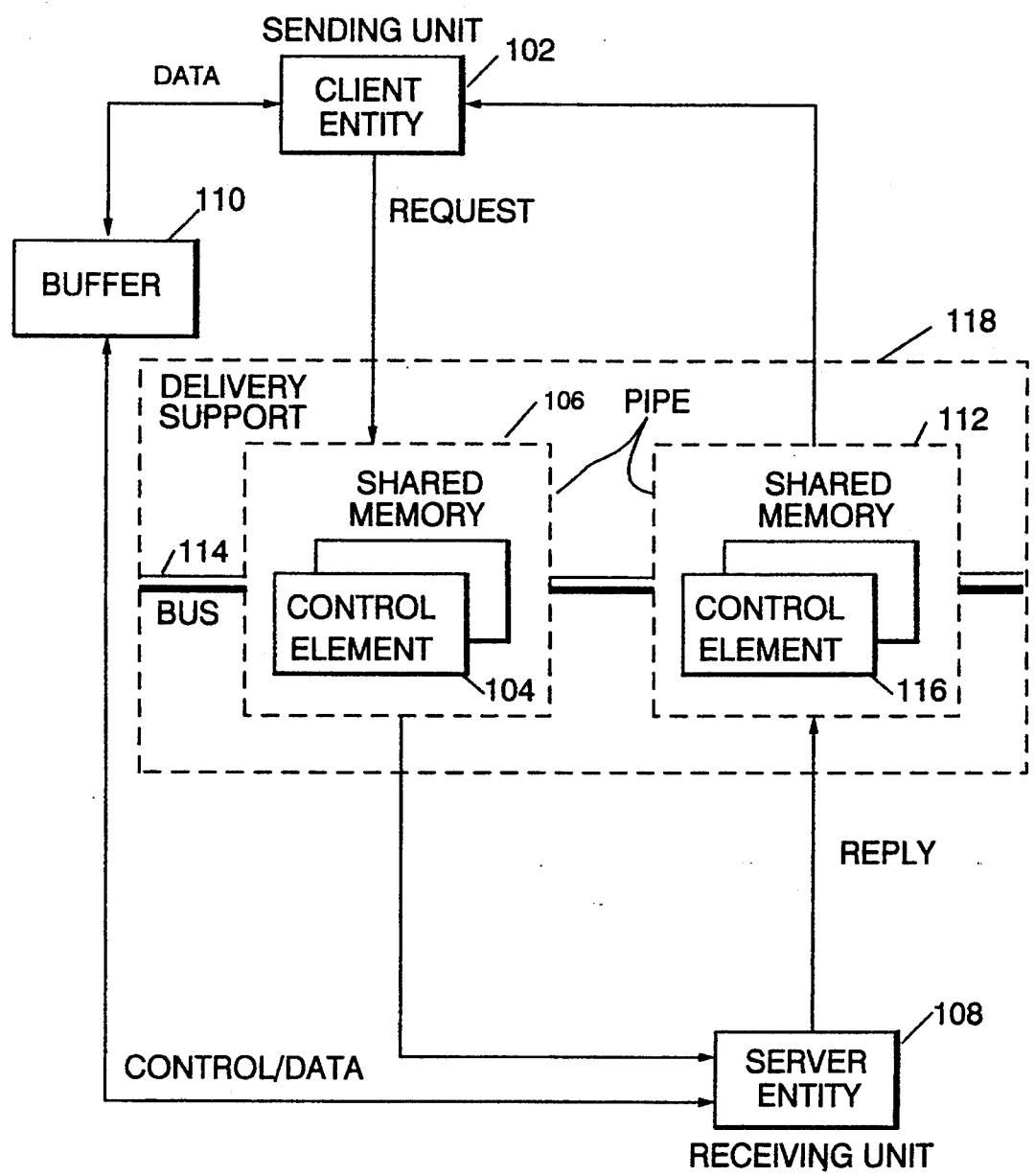
FIG. 1 is a high level diagram illustrating the flow of control elements, and information between a client entity and a server entity in subsystem control block architecture.

FIG. 1 shows the general flow of data and control information used in the invention. Client entity 202 sends a request to a server entity 208 by placing a request control element 204 on its outbound pipe 206. Server entity 208 reads the request control element from pipe 206, and performs the requested task. Pipe 206 is a defined block of addresses in shared memory. Commands and control information are contained in control element 204. If data is to be transferred from the client to the server, it is transferred in one of two ways. First, it can be directly transferred within a variable length field of the control element 204. The control element, including the placement of data within the control element, will be discussed in more detail hereinafter with reference to FIG. 3. Second, data can be transferred between client and server via buffer 210.

To transfer data through the buffer, sending unit 202 will place the address and length of the data into control element 204, and send the same to receiving unit 208 via pipe 206. The address and length of the data will tell the receiving unit the location, and quantity of information in buffer storage 210. The actual movement of data into and out of the buffer, as well as the pipe, can be accomplished by a number of conventional methods, well known in the art, such as through the use of DMA logic. Once the sending unit 202 has sent its control element, it does not have to wait for the receiving unit 208 to respond. Client 202 can proceed with other tasks, including the placement of other work requests as control elements in pipe 206 for receiving unit 208 or other receiving units.

The server, or receiving unit 208, retrieves control element 204 from pipe 206, and executes the work request contained in the control element 204. Server 208 takes action to respond to the request, and replies to the client 202 by sending control element 216 on pipe 212. If the server is sending data to the client, control element 216 will contain the data, or point to buffer storage 210 for transfer of the data. As was the case with client 202, server 208 does not wait for a response from the client, but proceeds to perform other tasks, such as the retrieval of additional control elements from pipe 206.

The flow of control and data discussed above is supported by delivery support system 218 and bus 214. Control elements and data are physically moved to and from the sending and receiving units via pipes 206, 212 and buffer 210, respectively, by way of the bus 214. Bus 214 is preferably a Micro Channel bus. Further, the delivery support includes enqueue/dequeue logic which will be described in more detail hereinafter.

Figure 2:
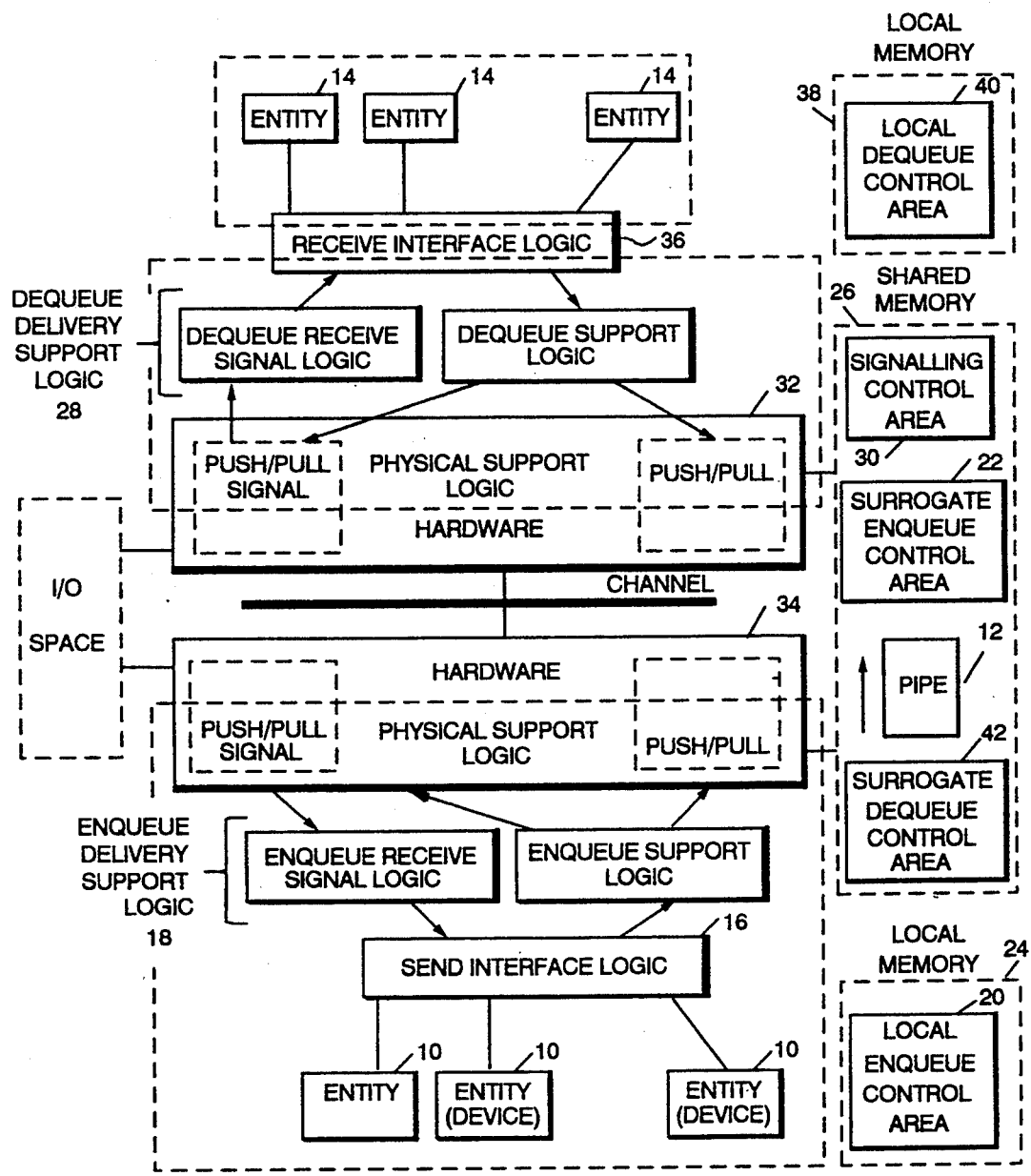
FIG. 2 illustrates the interaction of hardware components in subsystem control block architecture.

In FIG. 2, only half of a delivery support system is shown. As described above, each peer-to-peer communication between entities uses two pipes, one inbound and one outbound. Entities 10 are source entities who send control elements through pipe 12 to destination entities 14. Send interface logic 16 is responsible for sending control elements from a source entity in one unit to a destination entity in the same, or different, unit. Interface 16 enforces the protocols of the sending operation so that they are consistent with a particular implementation and operating environment for the system and entity. For example, it defines the form that the call takes, and how waits and sharing of the delivery pipe are handled. The send-interface logic 16 also handles the changing of addresses from the local memory 24 to the shared memory 26.

Send interface logic 16 calls the enqueue delivery support logic 18 with the address and count of the number of control elements to be sent. Using the information in the destination and length fields (FIG. 3) of each control element, the enqueue logic places the control elements, one at a time, into the appropriate delivery pipe. This continues until all the control elements are placed in the delivery pipe, or the pipe becomes full.

If the pipe becomes full, the enqueue logic stops enqueuing control elements, updates the status fields in the local enqueue area 20, and surrogate enqueue control area 22. The surrogate enqueue control area 22 contains the same information as the local control area 20. The information is copied from local memory 24 to shared memory 26 because it is needed by the dequeue delivery support logic 28, and logic 28 has access to shared memory 26, but not to local memory 24.

The enqueue logic 18, when pipe 12 is full, also sends a pipe full notification to the dequeue logic 28, and returns a pipe full signal to the send interface logic 16. Enqueue logic 18 sends a notification to the dequeue logic by first setting the dequeue state-change indicator in the signalling control area 30 assigned to the unit containing the source entity. The enqueue logic then invokes the signalling services of the physical support logic 32 and 34.

If the destination entity 14 is in a system unit, the physical support logic activates the appropriate interrupt-request line. If the destination entity is in an adapter or subsystem, the physical support logic writes the appropriate attention code into the Attention port of the adapter.

On the receive side, the receive interface logic 36 is responsible for providing the interface between the dequeue logic 28, and the destination entities 14. Interface logic 36 enforces the protocols of the receiving operation so that they are consistent with a particular implementation and operating environment for the system and entity. Receive interface logic 36 also handles the transformation of addresses, and the movement of control elements from the shared memory 26 to the local memory 38.

Receive interface logic 36 initiates the removal of control elements from pipe 12 by calling the dequeue logic 28. If there is a control element in the delivery pipe, dequeue logic calls the receive interface logic 36 with the address of the control element to be dequeued. The interface logic 36, using the destination and length information in the control element (FIG. 3), determines where the control element should be sent. Receive interface logic 36 may (1) route the control element to the destination entity, (2) place it in a queue for the destination entity, (3) return the control element to the source entity 10, or (4) discard the control element.

Receive interface logic returns process control to the dequeue logic. The dequeue logic 28 updates the local dequeue control area 40 and the surrogate dequeue control area 42, and returns process control to the receive interface logic. This process by receive interface logic 28 and dequeue logic 36 is repeated until all control elements are removed from pipe 12.

Figure 3:
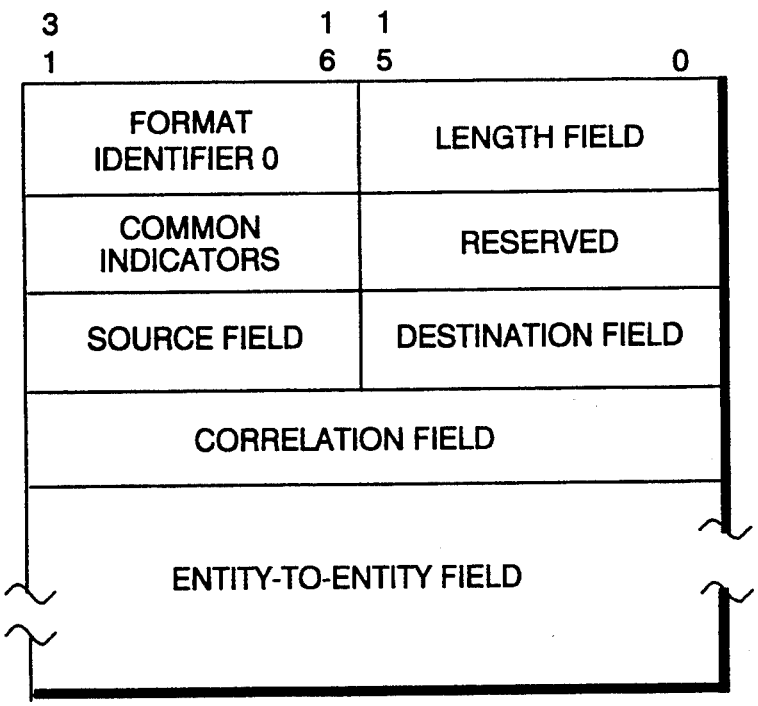
FIG. 3 shows the fields of control element.

The structure of the control element is shown in FIG. 3. Each control element contains a format identifier, a length field, common indicators field, source and destination fields, a correlation field and an entity-to-entity field that varies in length. The format identifier is at bits 16 to 31 of the first 32 bit byte in the control element. It is used to specify the format and content of the architecture defined portions of the control element. The length field is at bit positions 0 to 15 of the first 32 bit double word, and specifies the number of 32 bit double words in the control element.

As shown in FIG. 3, second byte of the control element bits 0-15 are reserved, and bits 16-31 contain the common indicators field. The common indicators field is used to identify control element type; request, reply, event, or error. This field contains function codes, such as initialize, read, write, execute list, reset, etc., and indicates how to interpret the remaining fields in the control element. In the third byte, bit positions 0-15 identify the destination of the control element, and bit positions 16-31 identify the source of the control element. The fourth byte of the control element is a correlation field. The correlation field is used to identify a reply, event, or error with a previous request control element.

The remaining bytes of the control element make up the entity-to-entity field. This field is variable in length. It contains information such as status, parameters, or data required by the client and server entities to perform the function codes identified in the request, reply, event or error; i.e., the common indicators field.

Figure 4:
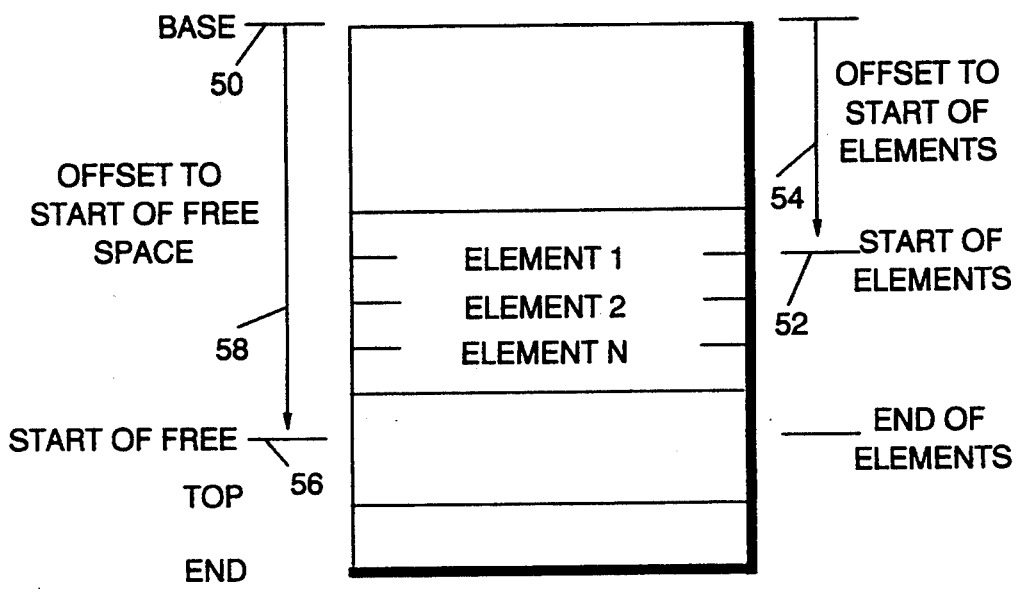
FIG. 4 shows the addressing structure of a delivery pipe for the control elements.

The structure of a delivery pipe, inbound or outbound, is shown in FIG. 4. A delivery pipe is a control area maintained in shared memory 26 (FIGS. 1 or 2). The pipe space is managed as a first-in first-out (FIFO) stream. Each pipe represents a circular queue of storage areas for the control elements. In FIG. 4, the start of the pipe is defined by a base address 50. The location of the first element to be read, Start of Elements (SE) address 52, which is defined by an offset 54 from the base address 50. The location of the beginning of free space is the Start of Free (SF) address 56. The SF address is defined by offset 58 relative to the base address 50. The SF address 56 is the same as the End of Elements (the end of the last control element read into the pipe) address. When the control elements wrap (not shown) in the delivery pipe, the SE address will have an offset 54 greater than the offset 58 for the SF address.

Figure 5:
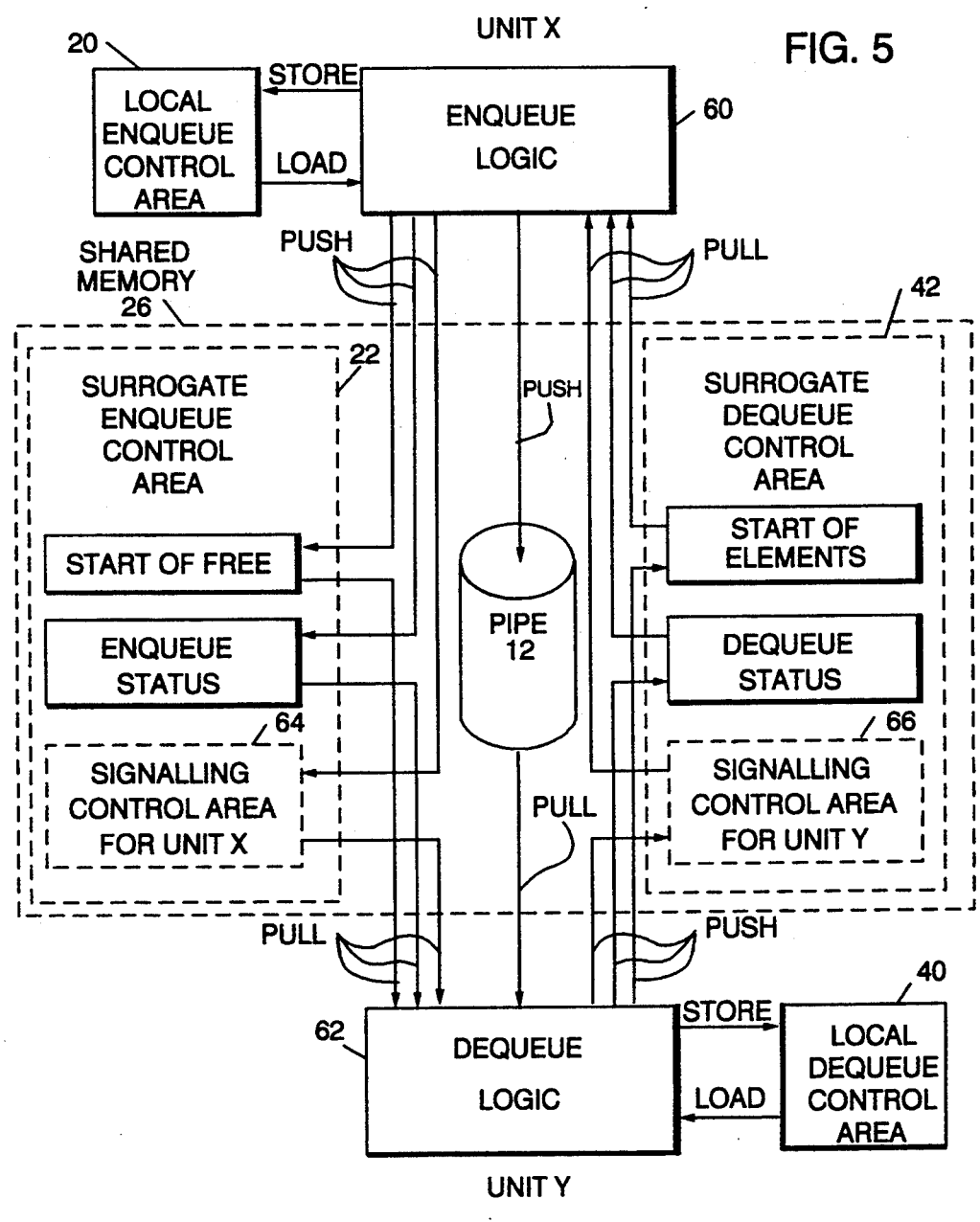
FIG. 5 shows the prior art process and apparatus of storing in shared memory surrogate control information organized as enqueue, or dequeue, information, and pushed and pulled piecemeal between entities.

In FIG. 5, the control of a delivery pipe with the information in control areas is shown. Although only one pipe is shown, another pipe, with its associated enqueue and dequeue logics, is required for communication between entities, as described in FIG. 1. The delivery pipe 12, surrogate enqueue control area 22, surrogate dequeue control area 42, and signalling control areas 64 and 66 are storage areas in shared memory 26. Each of stored bytes in the surrogate enqueue control area, the surrogate dequeue control area, and the signalling control area has a separate address. In other words, these bytes must be addressed separately; they are not written or read collectively.

The enqueue logic 60 for Unit X contains elements of the physical support logic 34, enqueue delivery support logic 18, and send interface logic 16 in FIG. 2. To push a control element onto pipe 12, enqueue logic 60 loads present Start of Free (SF) address and Enqueue Status (ES) from the local enqueue control area 20. The enqueue logic 60 also pulls Start of Elements (SE) address and Dequeue Status (DS) from the surrogate dequeue control area 42. Now, the enqueue logic knows where to place a control element in pipe from SF, and also knows how much free space is available from SE. The enqueue logic pushes the control element into pipe 12, stores an updated SF and ES in local enqueue control area 20, and pushes updated SF and ES into the surrogate enqueue control area 22.

At Unit Y, dequeue logic 62 is pulling control elements off pipe 12. Dequeue logic 62 reads SE and DS from the local dequeue control area 40. Logic 62 also pulls SF and ES from surrogate enqueue control area 22. Now, the dequeue logic 62 knows the location SE of the control element to be pulled from pipe 12, and also knows the location SF of the end of the last control element in the pipe. The dequeue logic pulls the control element from pipe 12, stores updated SE and DS in local dequeue control area 40, and pushes updated SE and DS to the surrogate dequeue control area 42.

The signalling control area 64 for Unit X and the signalling control area 66 for Unit Y are provided for passing signals directly between logic 60 and 62. The signals might be pipe changed from empty to not empty, from full to not full, element pushed on pipe, element pulled from pipe, etc.

Preferred Embodiments of the Invention

Figure 6:
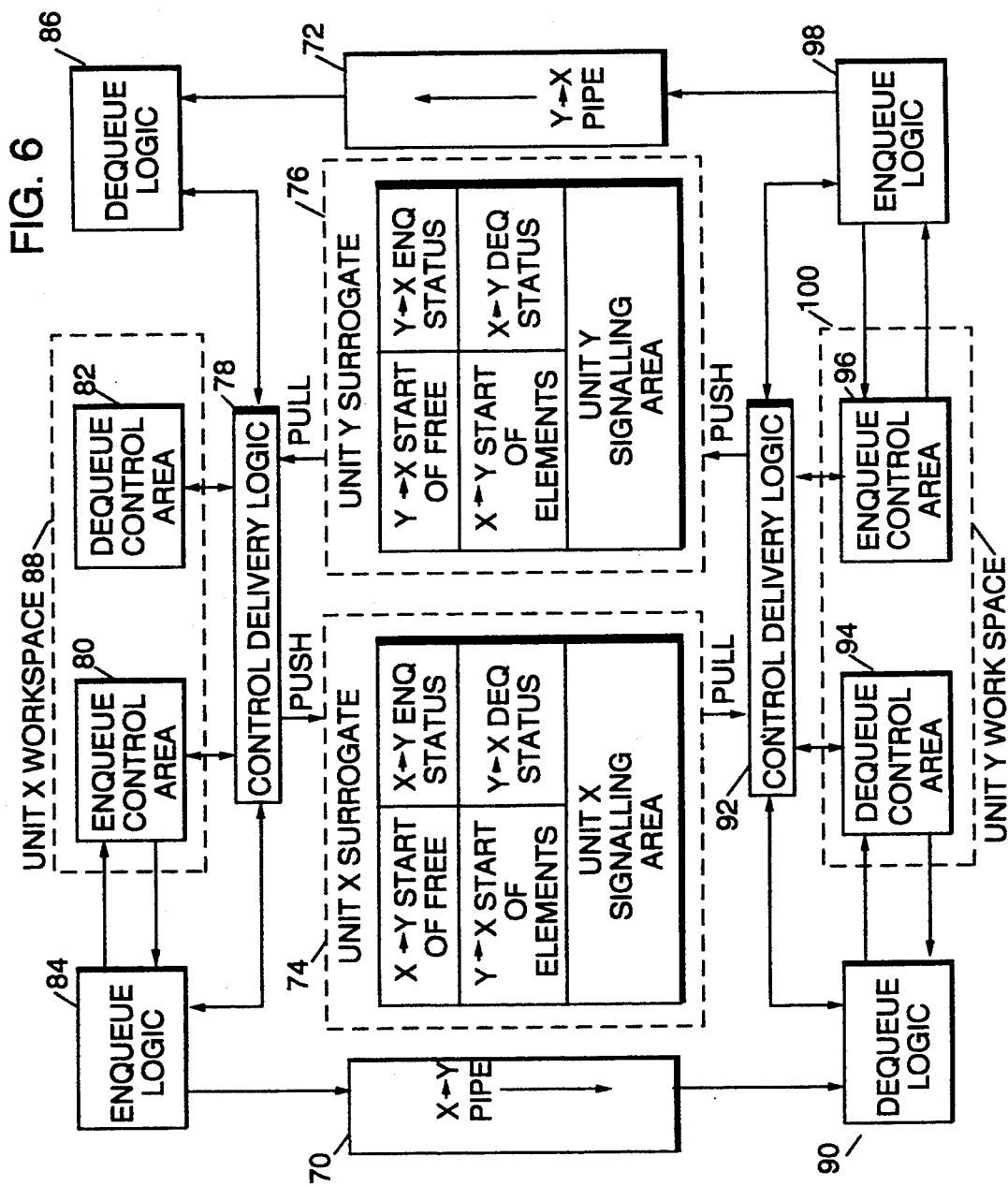
FIG. 6 shows the preferred embodiment of the control element enqueue and dequeue system where surrogate control information is organized by entity, and is pushed and pulled as a complete block of entity surrogate information.

FIG. 6 shows the preferred embodiment of the inventive structure for enqueue/dequeue control in the subsystem control block architecture. A complete control structure for bidirectional flow of control elements between two entities, Unit X and Unit Y, is illustrated. Pipes 70 and 72 are located in shared memory 26 (FIG. 5), and surrogate storage areas 74 and 76 are also in shared memory 26.

The Unit X and Unit Y surrogate storage areas 74 and 76 are significantly different from surrogate enqueue area 22 and surrogate dequeue area 42 (FIG. 5). First, the surrogate areas 74 and 76 are associated with their entity, Unit X or Unit Y, while the surrogate areas 22 and 42 are associated with function, enqueue or dequeue. For example, Unit X surrogate area 74 contains all the enqueue and dequeue information about Unit X required by Unit Y for Unit Y to enqueue control elements on pipe 72, or dequeue control elements from pipe 70.

Second, the surrogate areas 74 and 76 are addressed as a block of information containing multiple words, rather than being addressed multiple times for multiple words. In contrast to FIG. 5, the surrogate enqueue area has a separate address for Start of Free and Enqueue status; in FIG. 6, Unit Y Surrogate, containing five 16/32 bit words, is addressed as an entire block of information. For example, control delivery logic 78 pulls Unit Y surrogate area, which contains Y to X Start of Free, Y to X Enqueue status, X to Y Start of Elements, X to Y Dequeue Status, and Unit Y Signalling Area, as one block of information with a single address. Control delivery logic 78 then distributes the 16/32 bit words in this block to the enqueue control area 80 and dequeue control area 82 in the Unit X workspace. Enqueue logic 84 and dequeue logic 86 can then use the information stored, respectively, at the enqueue control area 80 and dequeue control area 82 to enqueue and dequeue control elements on the pipes 70 and 72 for Unit X. In operation, when Unit X wishes to enqueue a control element on pipe 70, enqueue logic 84 directs control delivery logic 78 to pull the Unit Y surrogate block of information into the Unit X workspace 88. The X to Y Start of Elements (SE) and the X to Y Dequeue Status (DS) are distributed to the enqueue control area by the control delivery logic 78. The enqueue control area 80 contains enqueue control registers and surrogate dequeue registers. Enqueue logic 84 now loads X to Y Start of Free (SF), X to Y Enqueue Status (ES), X to Y SE, and X to Y DS from enqueue control area 80 in its own workspace 88. Now the Unit X enqueue logic 84 knows it can place a control element in pipe 70 at location X to Y SF, and also knows how much free space is available before it would reach location X to Y SE. Enqueue logic 84 pushes the control element into pipe 70 at X to Y SF, and stores an updated X to Y SF and ES in enqueue control area 80. Logic 84 then commands control delivery logic 78 to assemble, and push an updated Unit X surrogate block of information 74 to the Unit X surrogate area in shared memory.

In operation, when Unit Y wishes to dequeue a control element from pipe 70, dequeue logic 90 commands control delivery logic 92 to pull the Unit X surrogate block of information 74 in shared memory. Delivery logic 92 pulls block 74, and distributes the X to Y Start of Free (SF) and X to Y Enqueue Status (ES) to the dequeue control area 94, and distributes Y to X SE and Y to X DS to enqueue control area 96 for use by enqueue logic 98. Dequeue logic 90 loads, from the dequeue control area 94, X to Y SE, X to Y DS, X to Y SF, and X to Y ES. Now the dequeue logic 90 knows the location X to Y SE of the control element to be pulled from pipe 70, and also knows the location X to Y SF of the end of the last control element in the pipe. The dequeue logic pulls the control element at X to Y SE from pipe 70, and stores updated X to Y SE and DS in dequeue control area 94. Dequeue logic then commands control delivery logic 92 to assemble an updated Unit Y surrogate block of information 76, and push block 76 to shared memory.

The Unit X surrogate 74 and Unit Y surrogate 76 blocks of information contain, respectively, Unit X signalling area, and Unit Y signalling area. The control delivery logic assembles, or distributes, the signalling areas from signalling registers (not shown), Unit X workspace 88 and Unit Y workspace 100. Unit X and Unit Y may push/pull messages to each other through the Unit X and Unit Y surrogate blocks of information.

Figures 7, 7A:
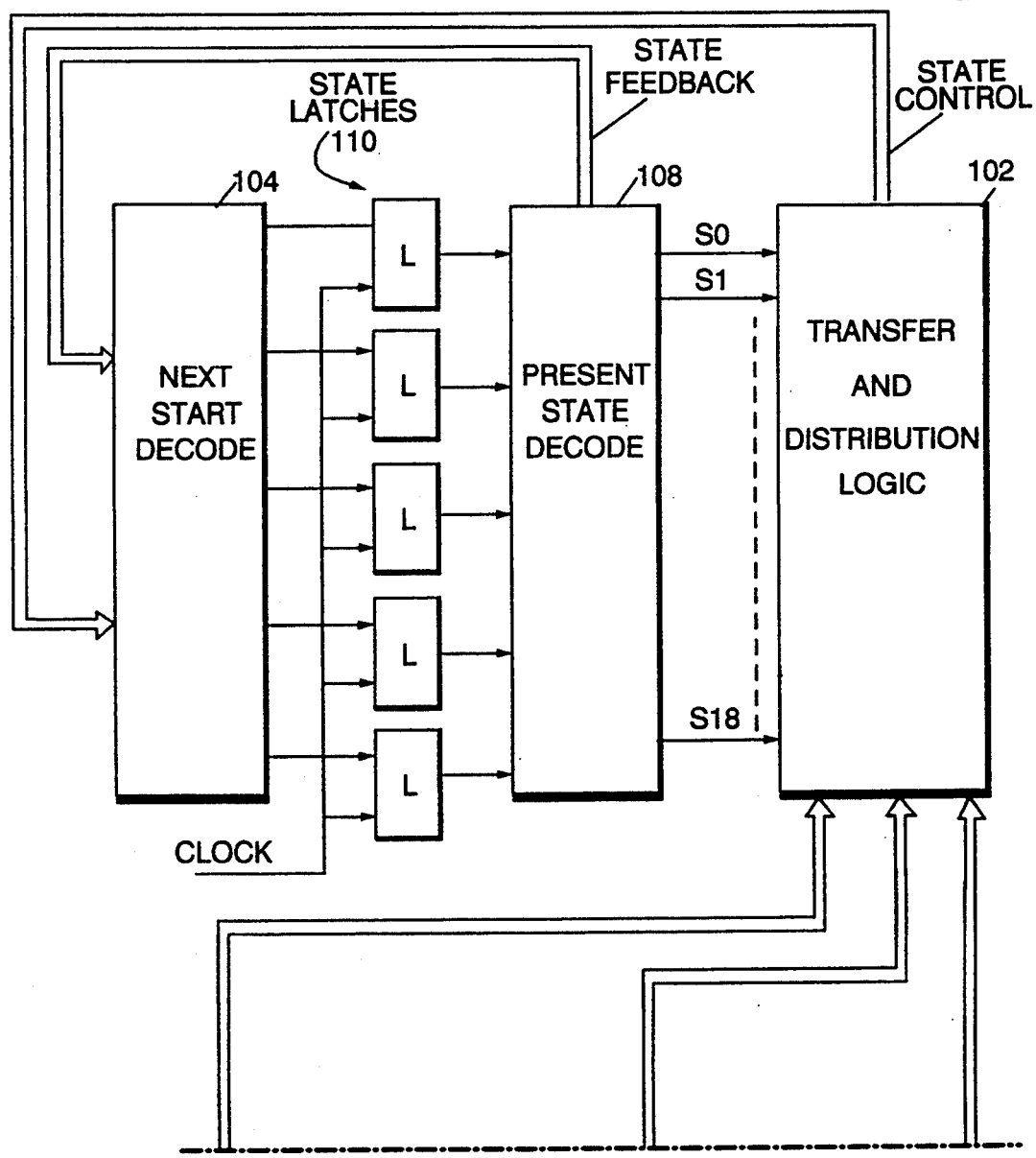
FIG. 7 illustrates a finite state machine that would be implemented at an entity in the system, and perform the enqueue/dequeue delivery support of control elements at that entity.
Figure 7B:
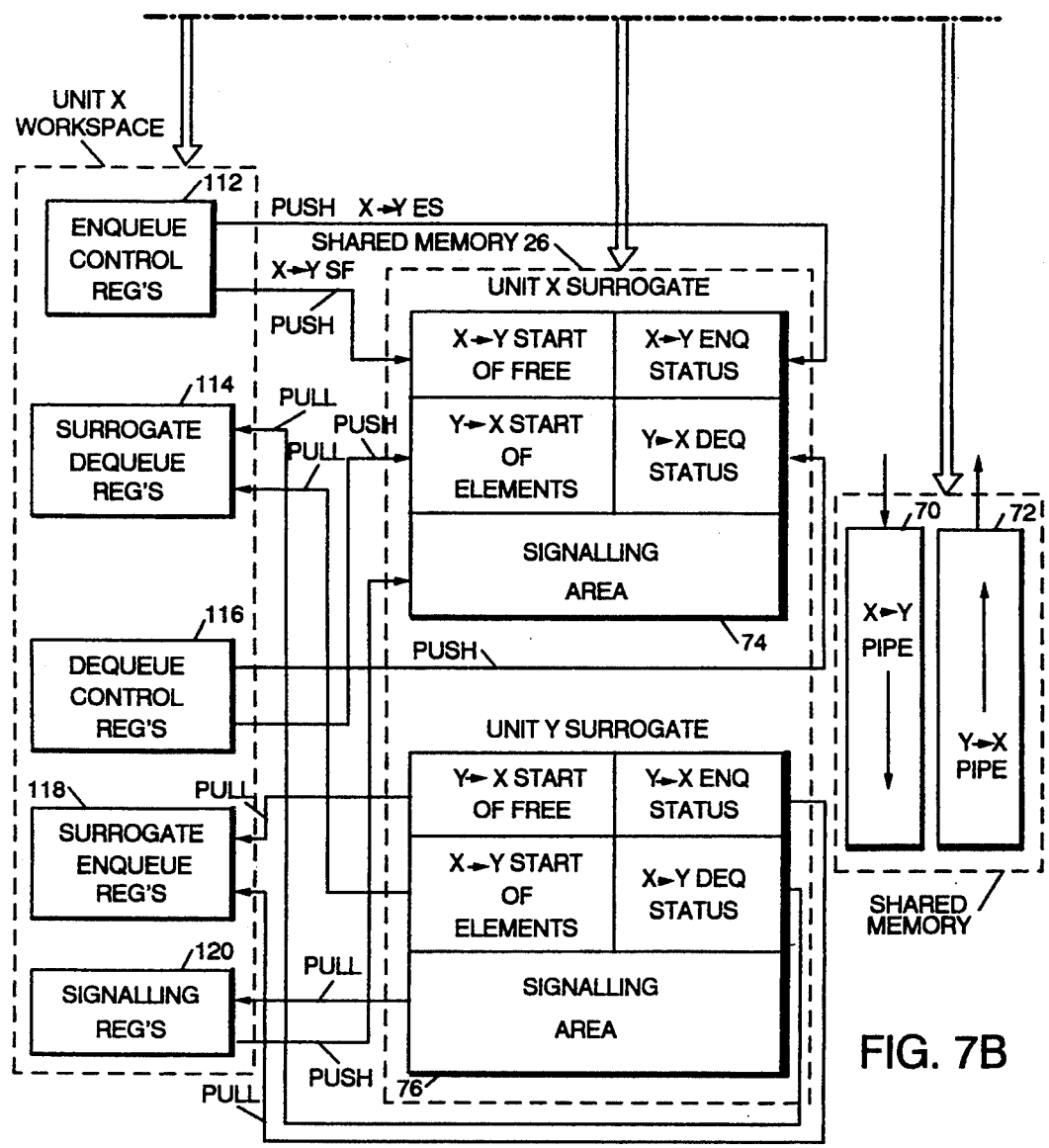

FIG. 7 shows the detailed structure of Unit X enqueue/dequeue delivery support which implements the enqueue logic 84, enqueue control area 80, dequeue logic 86, dequeue control area 82, and control delivery logic 78 of FIG. 6. The delivery support is preferably a finite state machine that controls the transfer and distribution of control elements in pipes 70 and 72, and Unit X and Unit Y surrogate blocks of information to local workspace.

The operations of transferring and distributing control information from the Unit X and Unit Y surrogate blocks 74 and 76 are performed by the transfer and distribution logic 102. Logic 202 also enqueues control elements to pipe 70, and dequeues control elements from pipe 72. As illustrated in FIG. 7, logic 202 is connected to Unit X workspace and shared memory to pull and distribute a Unit Y surrogate block of information to registers in Unit X, or to assemble and push Unit X surrogate block of information to shared memory. The assembly and push are represented by "PUSH" arrows in FIG. 7, while the pull and distribution are represented by "PULL" arrows in FIG. 7.

Logic 102 also generates state control signals that are passed to next state decode 104. Decode 104 also receives present state feedback from present state decode 108. Next state decode controls the process flow for the transfer and distribution logic 102 by setting the next state from present state information and state control information. The next state is gated into state latches 110 by a processor clock signal at the appropriate time, and becomes the present state. Present state decode 108 decodes the five binary bits from latches 110 into one of eighteen states used by logic 102.

In the Unit X workspace in FIG. 7, enqueue control registers 112 and surrogate dequeue registers 114 make up the enqueue control area described in FIG. 6. Similarly, the dequeue control area includes dequeue control registers 116, and surrogate enqueue registers 118. The signalling storage area (not shown) in FIG. 6 is signalling register 120 in FIG. 7. While registers are used in the Unit X workspace, local memory at Unit X could be used to store the information in registers 112-120.

To push a Unit X surrogate block 74, logic 202 first reads (1) X to Y SF and ES from enqueue control registers 112, (2) Y to X SE and DS from dequeue control registers 116, and (3) Unit X signals from signalling registers 120. Logic 102 assembles these 16/32 bit words into three 32-bit words that make up the Unit X surrogate block, and writes block 74 at a single address in shared memory 26.

To pull a Unit Y surrogate block 76, logic 102 reads the three 32-bit words of the Unit Y surrogate block from a single address in shared memory 26. Logic 102 then distributes and writes (1) Y to X SF and ES to surrogate enqueue registers 118, (2) X to Y SE and X to Y DS to surrogate dequeue registers 114, and (3) Unit Y signals to signalling registers 120.

Figure 8A:
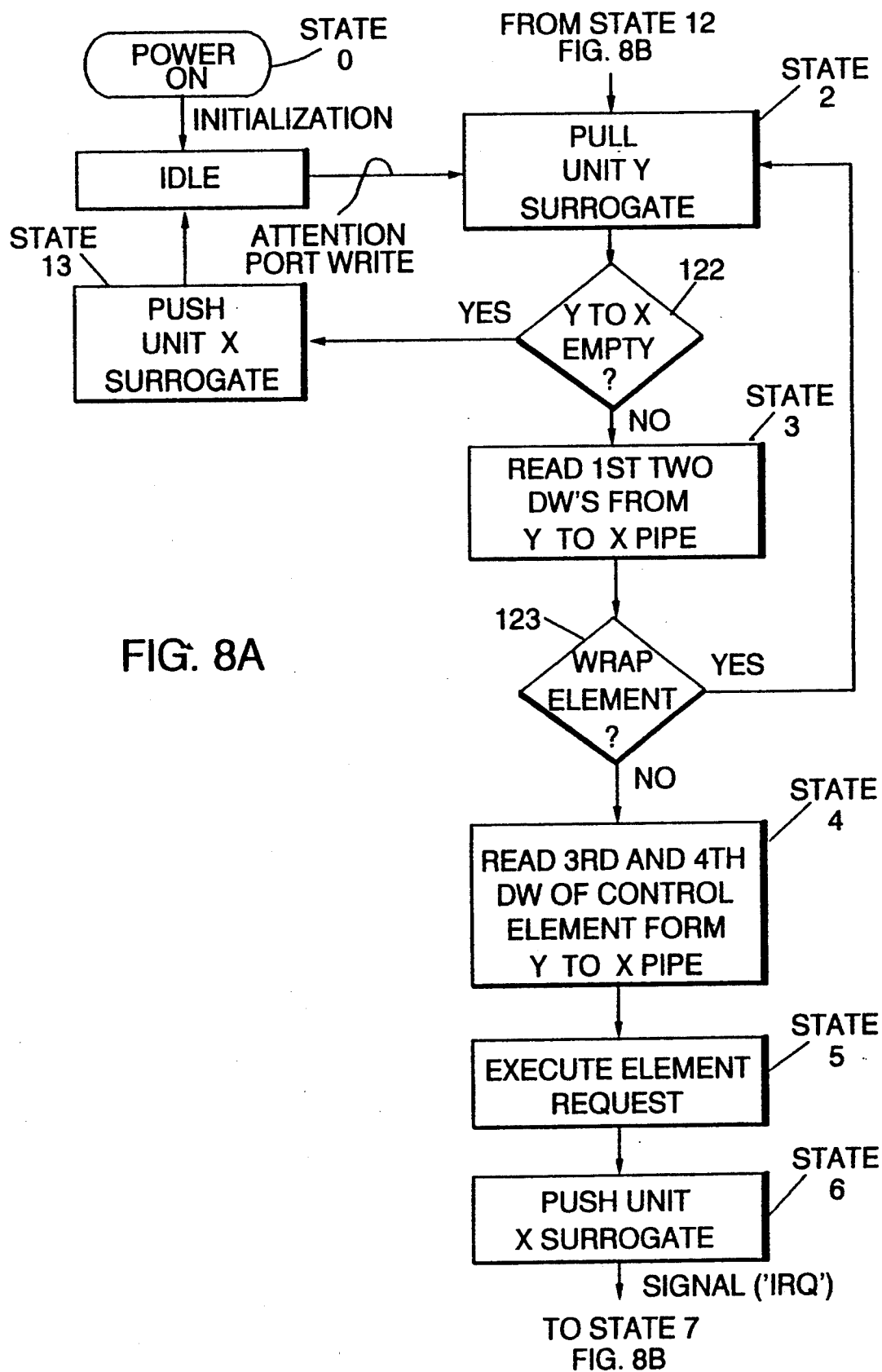
FIGS. 8A and 8B illustrate the process flow of the operation of the state machine in FIG. 7.
Figure 8B:
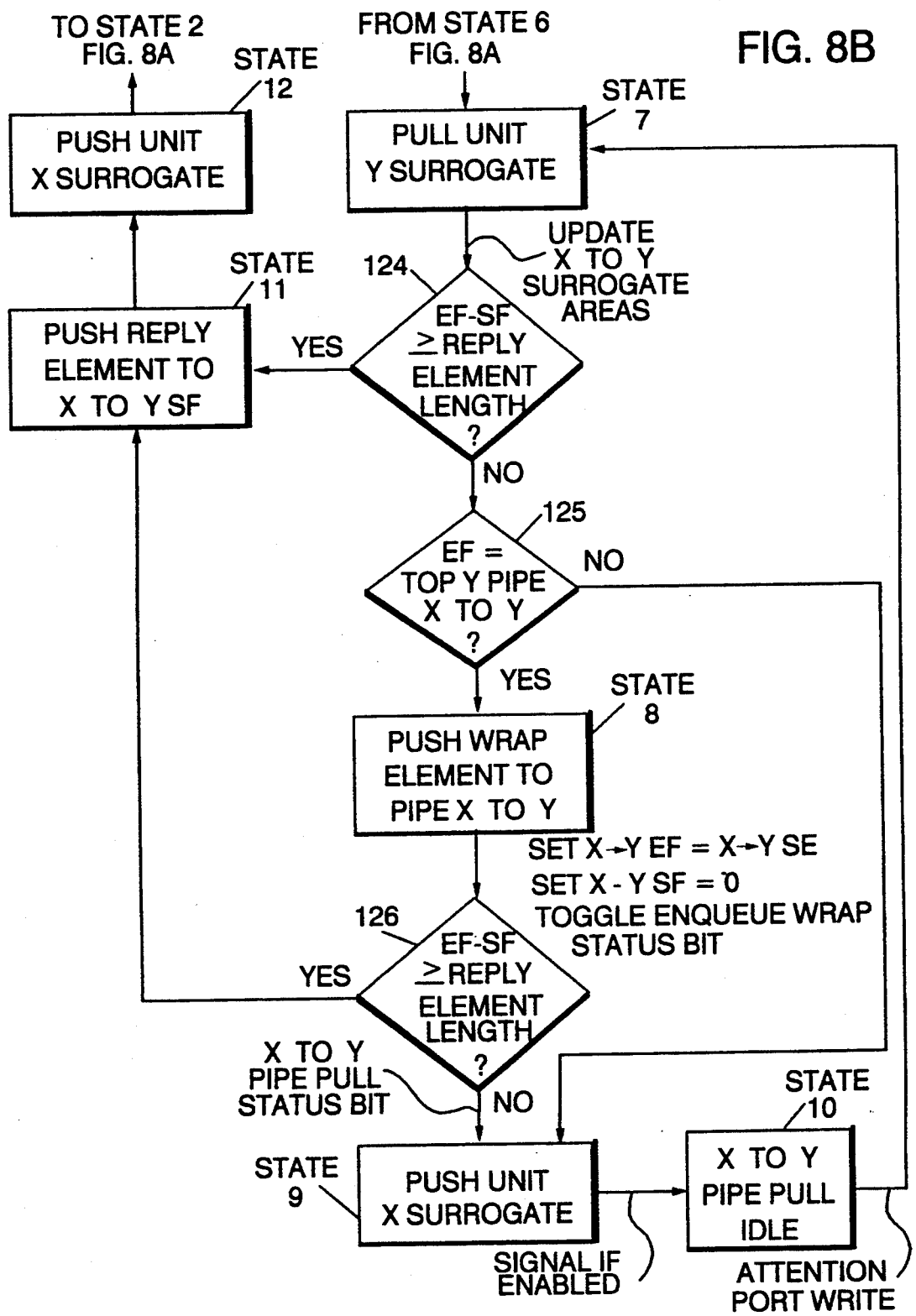

FIGS. 8A and 8B show the process flow for the transfer and distribution state machine shown in FIG. 7. In FIG. 8A, 'power on' State 0 is shown as the initial power-on condition of the state machine logic before the bus master has been initialized. Initialization of the Unit X configuration registers moves the state machine to idle condition State 1. The state machine logic remains in this idle condition until Unit Y writes to the attention port in Unit X, causing the state machine to switch to State 2, "Pull Unit Y Surrogate Area." During State 2, Unit X pulls the Unit Y surrogate block of information from shared memory in three consecutive double word (32-bit) pulls. The Unit Y surrogate information is then routed within the Unit X workspace, as shown in FIG. 7, and previously described.

Decision 122 tests for whether pipe Y to X is empty. The pipe is empty if Y to X SE=Y to X SF, and Y to X enqueue wrap bit equals Y to X dequeue wrap bit. If the Y to X pipe is empty, the state machine flow branches to State 13 where the Unit X surrogate block is pushed out to shared memory in three consecutive 32-bit pushes. Note that the Y to X Dequeue Status Field empty bit is updated as part of this push. The state machine then flows back to idle State 1, where it will remain until the Unit X attention port is again written to. Note that Unit X will signal an interrupt (IRQ) to Unit Y after completing State 13 if the Y to X pipe not empty to empty signalling condition is enabled.

If the answer to decision 122 is NO, then there are control elements in pipe Y to X to be dequeued, and Unit X goes to State 3. In State 3, the first two double words (32-bits) of the control element are read from pipe 72. Decision 123 checks the control element function code to determine if the control element is a wrap element. If the function code identifies the element as a wrap element, then the dequeue wrap status bit is toggled in the Unit X dequeue control area (94 in FIG. 6), and the Y to X SE is set to 0 to indicate that the dequeue process has wrapped back to the bottom of the Y to X pipe. Unit X then flows back to State 2 from decision 123 and, in State 2, the Unit Y surrogate area is pulled again. Decision block 122 checks for additional control elements in the pipe.

If the answer to decision 123 is NO, then the control element being dequeued from pipe Y to X is not a wrap element. The state machine moves to State 4 where the third and fourth double words of the control element are pulled into Unit X. These two double words contain the source, destination and correlation fields of the control element. Unit X is now ready to execute the process requested by Unit Y and, in State 5, executes one control element.

Execution of the control element may take the form of reading immediate data contained within the element itself, or reading/writing to/from data buffers pointed to by start address and buffer length pairs. Additional double words of the control element are pulled from the Y to X pipe by the Unit X dequeue logic (90 in FIG. 6) until the entire control element, as specified by the element length field, is processed.

Unit X enters State 6, and pushes Unit X surrogates at the completion of the element execution. During State 6, Unit X pushes its updated Y to X start of elements, Y to X dequeue status, and Unit X signalling area as part of the overall Unit X surrogate area. Note that Unit X will signal IRQ after completing State 6 if any of the dequeue signalling conditions have been met.

The Unit Y surrogate area is then pulled from shared memory in State 7. This surrogate information is routed to the Unit X workspace, as shown in FIG. 7. Decision 124 then tests to see if the X to Y pipe has enough free space within which Unit X can enqueue the REPLY element. Note that this is done if the space between the X to Y SF and the X to Y EF is greater than, or equal to, the size of the REPLY element to be enqueued. If answer to decision 124 is NO (not enough space), then the state machine moves to decision 125.

Decision 125 determines if the X to Y EF is equal to the top of the pipe offset. If X to Y EF is equal to the top of the pipe offset, then the state machine moves to State 8 where Unit X will push a wrap element onto the top of the X to Y pipe. The X to Y EF can then be set equal to the X to Y SE, and the X to Y SF is set equal to 0. Also, note that the enqueue wrap status bit is toggled in the Unit X enqueue control area (112 in FIG. 7) after the wrap element is pushed onto the X to Y pipe.

Decision 126 then tests whether there is enough room, starting at the bottom of the pipe, within which to enqueue the REPLY element. If the outcome of decision 126 is NO, then there still is not enough room in the pipe for Unit X to enqueue the REPLY element, and the state machine moves to State 9 where Unit X pushes out the Unit X surrogate area. Note that the X to Y pipe full status bit is set in the X to Y enqueue status field before the Unit X surrogate is updated.

State 10, X to Y pipe full idle state, is entered upon the completion of State 9. Unit X will signal Unit Y after pushing the Unit X surrogate if X to Y pipe not full to full signalling is enabled. The state machine will stay in the idle State 10 until Unit Y signals Unit X by writing to the Unit X attention port. Unit X then moves back to State 7 to pull in the most recent Unit Y surrogate information to see if there is now sufficient room in the X to Y pipe within which to enqueue the REPLY element.

If the outcome of decision 125 is NO, then a wrap element cannot be placed, and Unit X moves directly to State 9. Note that the X to Y pipe full status bit is set in the X to Y enqueue status area before the Unit X surrogate is pushed.

If decision 124 or decision 126 is YES, then there is enough room in the X to Y pipe for Unit X to push the REPLY element, and Unit X moves to State 11. The Unit X enqueue logic (98 in FIG. 6) pushes the REPLY element onto the X to Y pipe starting at the offset pointed to by the X to Y SF. Unit X then moves to State 12 where the Unit X surrogate area is pushed out to shared memory by the Unit X control delivery logic (92 in FIG. 6). Note that the X to Y start of free, X to Y surrogate and Unit X signalling fields are all updated before the Unit X surrogate is pushed. Also note that Unit X will signal Unit Y upon the completion of State 12 if the X to Y empty to not empty signalling conditions have been met. Unit X then flows back to State 2 where the Unit Y surrogate is again pulled to determine if any additional control elements remain on the Y to X pipe to be dequeued.

While a number of preferred embodiments of the invention have been shown and described, it will be appreciated by one skilled in the art, that a number of further variations, or modifications, may be made without departing from the spirit and scope of my invention.

What is claimed is:

1. A method for use in each entity in a computing system when controlling data transfers between first and second entities in the system with data transfer control elements pointing to data to be transferred in the transfer operations, said computing system having a memory shared by said first and second entities, said method comprising the steps of:

writing first surrogate control information from the first entity to the shared memory for use by the second entity, said first surrogate control information having both the enqueue and dequeue control information for enqueuing and dequeuing of control elements by the first entity;

reading second surrogate control information of the second entity from shared memory to the first entity, said second surrogate control information having both the enqueue and dequeue control information for the enqueuing and dequeuing of control elements by the second entity;

enqueue controlling the flow of control elements from the first entity to the second entity based on control information stored in the first entity, said stored control information containing in part first entity control information and in part read second entity surrogate control information; and dequeue controlling the flow of control elements from the second entity to the first entity based on control information stored in the first entity, said stored control information containing in part first entity control information and in part read second entity surrogate control information.

2. The method of claim 1 wherein said writing step comprises the steps of:

assembling enqueue and dequeue control information from first entity storage for shared memory storage as first entity surrogate control information; and delivering the first entity surrogate control information from the first entity to shared memory.

3. The method of claim 2 wherein said reading step comprises the steps of:

delivering the second entity surrogate control information from shared memory to the first entity; and distributing enqueue and dequeue control information from the second entity surrogate control information to storage in the first entity.

4. Apparatus in each entity in a computing system for controlling data transfers between first and second entities in the system with data transfer control elements pointing to data to be transferred in the transfer operations, said computing system having a memory shared by said first and second entities, said entities having local storage areas, said controlling apparatus comprising:

means connected to the first entity storage area and the shared memory for writing first surrogate control information from the first entity storage area to the shared memory, said first surrogate control information having both the enqueue and dequeue control information on the enqueuing and dequeuing of control elements by the first entity;

means connected to the shared memory and the first entity storage area for reading surrogate control information of the second entity from shared memory to the first entity storage area, said second surrogate control information having both the enqueue and dequeue control information on the enqueuing and dequeuing of control elements by the second entity;

means connected to the first entity local storage area for enqueuing control elements for transfer from the first entity to the second entity based on control information stored in the first entity local storage area, said stored control informaton containing in part first entity control information and in part read second entity surrogate control information; and means connected to the first entity local storage area for dequeuing control elements for transfer from the second entity to the first entity based on control information stored in the first entity local storage area, said stored control informaton containing in part first entity control information and in part read second entity surrogate control information.

5. The apparatus of claim 4 wherein said writing means comprises:

means connected to the first entity local storage area for assembling enqueue and dequeue control information from first entity local storage area as first entity surrogate control information; and means connected to shared memory for delivering the first entity surrogate control information from the first entity to shared memory.

6. The apparatus of claim 5 wherein said reading means comprises:

means connected to shared memory for delivering the second entity surrogate control information from shared memory to the first entity; and means connected to the first entity local storage area for distributing enqueue and dequeue control information from the second entity surrogate control information to the first entity local storage area.

7. The apparatus of claim 6 wherein the local storage area in each entity comprises:

enqueue control storage means for storing local enqueue control information and surrogate dequeue control information; and dequeue control storage means for storing local dequeue control informaton and surrogate enqueue control information.

8. In a computing system having one-way, first-in first-out delivery pipes in storage shared by entities in the computing system, the delivery pipes delivering data transfer control elements between first and second entities in the computing system, data transfer control apparatus comprising:

enqueue control storage means in each entity connected to an outbound pipe for storing the current locations of free space in the outbound pipe for the entity;

enqueue logic means in each entity connected to said enqueue control storage means for enqueuing control elements onto the outbound pipe if there is sufficient free space in the outbound pipe to receive a control element;

dequeue control storage means in each entity connected to an inbound pipe for storing the current locations of control elements in the inbound pipe for the entity;

dequeue logic means in each entity connected to said dequeue control storage means for dequeuing control elements from the outbound pipe if there are control elements in the outbound pipe;

first entity surrogate storage means connected to said shared storage for storing in said shared storage first entity surrogate control information about the inbound and outbound pipes indicating the location of free space and control elements in the pipes as determined by the first entity;

second entity surrogate storage means connected to said shared storage for storing in said shared storage second entity surrogate control information about the inbound and outbound pipes indicating the location of free space and control elements in the pipes as determined by the second entity;

means connected to said second entity surrogate storage means and to said enqueue and dequeue control storage means in the first entity for reading all of the second entity surrogate control information from said second entity surrogate storage means to said enqueue and dequeue control storage means in the first entity; and means connected to said enqueue and dequeue control storage means in the first entity and to said first entity surrogate storage means for writing all of the first entity surrogate control information from said enqueue and dequeue control storage means in the first entity to said first entity surrogate storage means.

9. The apparatus of claim 8 wherein said reading means comprises:

means connected to said second entity surrogate storage means for transferring all of the second entity surrogate control information as a single addressable block of information from said second entity surrogate storage means to the first entity; and means connected to said enqueue and dequeue control storage means in the first entity for distributing the second entity surrogate control information to said enqueue and dequeue control storage means in the first entity.

10. The apparatus of claim 9 wherein said writing means comprises:

means connected to said enqueue and dequeue control storage means in the first entity for assembling the first entity surrogate control information from said enqueue and dequeue control storage means in the first entity; and means connected to said first entity surrogate storage means for transferring all of the first entity surrogate control information as a single addressable block of information from the first entity to said first entity surrogate storage means.

11. A method for use in each entity of a plural entity computing system when controlling data transfer between a first entity and a second entity, wherein data transfer control elements point to data to be transferred, and wherein said computing system has memory that is shared by the plural entities, said method comprising the steps of:

writing second entity surrogate control information from the second entity to the shared memory for use by the first entity, said second entity surrogate control information having both enqueue and dequeue control information;

reading the second entity surrogate control information from the shared memory to the first entity;

enqueue controlling the flow of control elements from the first entity to the second entity based on first control information stored in the first entity, said first control information containing in part first entity control information and in part read second entity surrogate control information; and dequeue controlling the flow of control elements from the second entity to the first entity based on second control information stored in the first entity, said second control information containing in part first entity control information and in part read second entity surrogate control information.

12. The method of claim 11 wherein said writing step comprises the steps of:

assembling enqueue and dequeue control information at the second entity as assembled second entity surrogate control information; and writing the assembled second entity surrogate control information to the shared memory.

13. The method of claim 12 wherein said reading step comprises the steps of:

reading the assembled second entity surrogate control information from the shared memory; and distributing to the first entity the read assembled second entity surrogate control information.

14. Apparatus for controlling data transfers between any two of the entities of a plural entity computing system, with data transfer control elements pointing to data to be transferred, said computing system having memory shared by all entities, and each of said entities having a local storage area, said apparatus comprising:

means connected to the local storage area of a writing entity and to said shared memory for writing surrogate control information from the local storage area of the writing entity to the shared memory, said surrogate control information having both enqueue and dequeue control information on the enqueuing and dequeuing of control elements by the writing entity;

means connected to the shared memory and to the local storage area of a reading entity for reading surrogate control information of the writing entity from shared memory to the local storage area of the reading entity;

means connected to the local storage area of the reading entity for enqueuing control elements for transfer from the reading entity to the writing entity based on control information stored in the local storage area of the reading entity, said stored control information containing in part control information of the reading entity and in part read surrogate control information of the writing entity; and means connected to local storage area of the reading entity for dequeuing control elements for transfer from the reading entity to the writing entity based on control information stored in the reading entity local storage area, said stored control information containing in part control information of the reading entity and in part read surrogate control information of the writing entity.

15. The apparatus of claim 14 wherein said writing means comprises:

means connected to the local storage area of the writing entity for assembling enqueue and dequeue control information from the local storage area of the writing entity; and means connected to the shared memory for delivering the assembled control information from the writing entity to the shared memory.

16. The apparatus of claim 15 wherein said reading means comprises:
- means connected to the shared memory for delivering the surrogate control information of the writing entity from shared memory to the local storage area of the reading entity; and
- means connected to the local storage area of the reading entity for distributing enqueue and dequeue control information from the delivered surrogate control information of the writing entity to the local storage area of the reading entity.

17. The apparatus of claim 16 wherein the local storage area in each entity comprises:
- enqueue control storage means for storing local enqueue control information and surrogate dequeue control information of a writing entity; and
- dequeue control storage means for storing local dequeue control information and surrogate enqueue control information of a writing entity.

18. In a computing system having one-way, first-in first-out outbound and inbound delivery pipes in storage that is shared by a plurality of entities in the computing system, the delivery pipes delivering data transfer control elements between the entities, data transfer control apparatus in each entity comprising:
- enqueue control storage means in an entity connected to an outbound pipe for the entity for storing the current locations of free space in the outbound pipe for the entity;
- enqueue logic means in the entity connected to said enqueue control storage means for enqueuing control elements onto the outbound pipe if there is sufficient free space in the outbound pipe to receive a control element;
- dequeue control storage means in the entity connected to an inbound pipe for the entity for storing the current locations of control elements in the inbound pipe for the entity;
- dequeue logic means in the entity connected to said dequeue control storage means for dequeuing control elements from the outbound pipe if there are control elements in the outbound pipe;
- surrogate storage means in the entity connected to said enqueue and to dequeue control storage means for storing in said surrogate storage means control information about the control elements and free space in the inbound and outbound pipes of the entity;
- means connected to said surrogate storage means and to said shared storage for writing surrogate control information of the entity to said shared storage, and
- means connected to said shared storage and to said enqueue and dequeue control storage means of the entity for reading surrogate control information as determined by another entity from said shared storage to said enqueue and dequeue control storage means.

19. The apparatus of claim 18 wherein said reading means comprises:
- means connected to the shared storage for transferring the another entity surrogate control information as a single addressable block of information from said shared storage to said enqueue and dequeue storage means of the entity.

20. The apparatus of claim 19 wherein said writing means comprises:
- means connected to the enqueue and dequeue control storage means of the entity for assembling the surrogate control information from the enqueue and dequeue control storage means in the entity; and
- means connected to the shared storage for transferring the assembled surrogate control information of the entity as a single addressable block of information to the shared storage.

* * * * *